(12) United States Patent
Li

(10) Patent No.: US 11,337,173 B2
(45) Date of Patent: May 17, 2022

(54) METHOD AND DEVICE FOR SELECTING FROM A PLURALITY OF BEAMS

(71) Applicant: Beijing Xiaomi Intelligent Technology Co., Ltd., Beijing (CN)

(72) Inventor: Jiongliang Li, Beijing (CN)

(73) Assignee: Beijing Xiaomi Intelligent Technology Co., Ltd., Beijing (CN)

( * ) Notice: Subject to any disclaimer, the term of this patent is extended or adjusted under 35 U.S.C. 154(b) by 351 days.

(21) Appl. No.: 16/555,237

(22) Filed: Aug. 29, 2019

(65) Prior Publication Data

US 2020/0163038 A1 May 21, 2020

(30) Foreign Application Priority Data

Nov. 20, 2018 (CN) .......................... 201811385651.1

(51) Int. Cl.
*G10L 15/22* (2006.01)
*H04W 56/00* (2009.01)
(Continued)

(52) U.S. Cl.
CPC ......... *H04W 56/0065* (2013.01); *G10L 15/22* (2013.01); *G10L 21/0216* (2013.01);
(Continued)

(58) Field of Classification Search
CPC ............. H04W 56/0065; H04B 7/0408; H04B 7/0617; H04B 7/0695; H04L 27/2657;
(Continued)

(56) References Cited

U.S. PATENT DOCUMENTS 9,820,036 B1 * 11/2017 Tritschler ............ G10L 21/0208
10,051,366 B1 * 8/2018 Buoni ..................... G10L 15/22
(Continued)

FOREIGN PATENT DOCUMENTS

CN 108122563 A 6/2018
CN 109599104 A 4/2019

OTHER PUBLICATIONS

Extended Search Report for European Application No. 19194373.7 from the European Patent Office, dated Dec. 20, 2019.

*Primary Examiner* — Edan Orgad
*Assistant Examiner* — Malick A Sohrab
(74) *Attorney, Agent, or Firm* — Finnegan, Henderson, Farabow, Garrett & Dunner, L.L.P.

(57) ABSTRACT

The present disclosure relates to a method and device for selecting from a plurality of beams. The method includes: obtaining a plurality of beam data, and performing frequency sampling on each of the plurality of beam data; obtaining a plurality of beam frequency correlation coefficients based on frequency sampling data of each of the plurality of beam data, in which a beam frequency correlation coefficient is configured to indicate a similarity between one in the plurality of beam data and another one in the plurality of beam data; obtaining a beam frequency correlation coefficient sum corresponding to each of the plurality of beam data based on the plurality of beam frequency correlation coefficients; and selecting beam data having the beam frequency correlation coefficient sum satisfying a preset correlation coefficient requirement in the plurality of beam data as target beam data.

18 Claims, 11 Drawing Sheets

(51) Int. Cl.
*H04B 7/0408* (2017.01)
*H04B 7/06* (2006.01)
*H04L 27/26* (2006.01)
*G10L 21/0216* (2013.01)

(52) U.S. Cl.
CPC ......... *H04B 7/0408* (2013.01); *H04B 7/0617* (2013.01); *H04B 7/0695* (2013.01); *H04L 27/2657* (2013.01); *H04L 27/2666* (2013.01); *G10L 2015/223* (2013.01); *G10L 2021/02166* (2013.01)

(58) Field of Classification Search
CPC . H04L 27/2666; G10L 21/0216; G10L 15/22; G10L 2015/223; G10L 2021/02166; H04R 3/005; G01S 7/4911; G01S 7/484
See application file for complete search history.

(56) References Cited

U.S. PATENT DOCUMENTS

| | | | |
|---|---|---|---|
| 10,622,004 | B1* | 4/2020 | Zhang ............... G10L 25/78 |
| 2006/0015331 | A1* | 1/2006 | Hui ............... G10L 21/0272 |
| | | | 704/227 |
| 2013/0083943 | A1* | 4/2013 | Sorensen ............. G01S 3/8086 |
| | | | 381/92 |
| 2017/0372722 | A1* | 12/2017 | Li ............... H04B 3/23 |

* cited by examiner

METHOD AND DEVICE FOR SELECTING FROM A PLURALITY OF BEAMS

CROSS-REFERENCE TO RELATED APPLICATIONS

This application is based on and claims priority to Chinese Patent Application No. 201811385651.1, filed on Nov. 20, 2018, the entire content of which is incorporated herein by reference.

TECHNICAL FIELD

The present disclosure generally relates to the field of digital signal processing technology, and more particularly, to a method and device for selecting from a plurality of beams.

BACKGROUND

With the rapid development of artificial intelligence technology, intelligent home devices are widely used. An intelligent home device is generally provided with a microphone array including a plurality of sound acquisition modules and, through the microphone array, the sound signal can be collected, and beamforming can be performed according to the collected sound signal to obtain a plurality of beam data corresponding to different directions, so as to facilitate wake-up word detection with the plurality of beam data, and wake up the intelligent home device after a set keyword in the beam data is detected. In the related art, in order to increase the speed of waking up the intelligent home device, parallel wake-up word detection is performed on the plurality of beam data respectively.

Although the above solution can increase the speed of waking up the intelligent home device, since the parallel wake-up word detection needs to consume more processing resources and requires high computing capability for the intelligent home device, the manufacturing cost of the intelligent home device is increased, and the user experience is degraded.

SUMMARY

According to a first aspect of embodiments of the present disclosure, there is provided a method for selecting from a plurality of beams. The method includes: obtaining a plurality of beam data, and performing frequency sampling on each of the plurality of beam data; obtaining a plurality of beam frequency correlation coefficients based on frequency sampling data of each of the plurality of beam data, in which a beam frequency correlation coefficient is configured to indicate a similarity between one in the plurality of beam data and another one in the plurality of beam data; obtaining a beam frequency correlation coefficient sum corresponding to each of the plurality of beam data based on the plurality of beam frequency correlation coefficients; and selecting beam data having the beam frequency correlation coefficient sum satisfying a preset correlation coefficient requirement in the plurality of beam data as target beam data.

According to a second aspect of embodiments of the present disclosure, there is provided a device for selecting from a plurality of beams. The device includes a processor, and a memory configured to store instructions executable by the processor. The processor is configured to: obtain a plurality of beam data, and perform frequency sampling on each of the plurality of beam data; obtain a plurality of beam frequency correlation coefficients based on frequency sampling data of each of the plurality of beam data, in which a beam frequency correlation coefficient is configured to indicate a similarity between one in the plurality of beam data and another one in the plurality of beam data; obtain a beam frequency correlation coefficient sum corresponding to each of the plurality of beam data based on the plurality of beam frequency correlation coefficients; and select beam data having the beam frequency correlation coefficient sum satisfying a preset correlation coefficient requirement in the plurality of beam data as target beam data.

According to a third aspect of embodiments of the present disclosure, there is provided a computer-readable storage medium having stored thereon instructions. When the instructions are executed by a processor of a device, the instructions cause the device to perform the method according to the first aspect of embodiments of the present disclosure.

It is to be understood that both the foregoing general description and the following detailed description are exemplary and explanatory only and are not restrictive of the present disclosure.

BRIEF DESCRIPTION OF THE DRAWINGS

The drawings shown herein, which are incorporated in and constitute a part of the specification, illustrate embodiments of the present disclosure and are used for explaining the principle of the present disclosure together with the specification.

DETAILED DESCRIPTION

Figure 1:
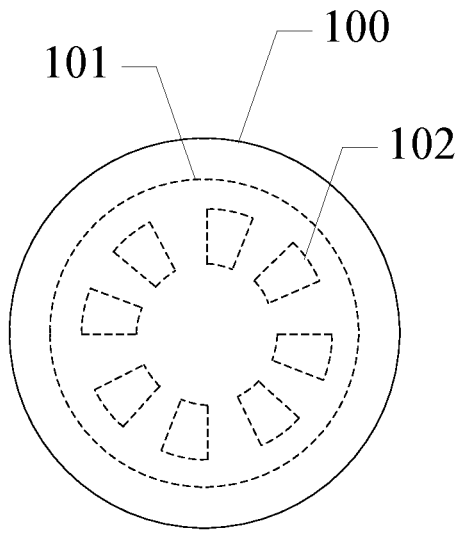
FIG. 1 is a schematic diagram of an application scenario of a method for selecting from a plurality of beams according to an exemplary embodiment of the present disclosure.

Exemplary embodiments will be described in detail, in which the examples are shown in the accompanying drawings. In the specification with reference to the drawings, unless specified otherwise, the same or similar elements and the elements having same or similar functions are denoted by like reference numerals. The implementations described in the following exemplary embodiments do not represent all implementations consistent with the present disclosure. Instead, they are merely examples of the device and method consistent with some aspects of the present disclosure.

With the rapid development of science and technology and the continuous improvement of people's living standards, artificial intelligence technology has developed rapidly in recent years, and the application of intelligent home devices has become more and more extensive.

An intelligent home device is generally provided with a microphone array including a plurality of sound acquisition modules and, through the microphone array, the sound signal can be collected, and beamforming can be performed according to the collected sound signal to obtain a plurality of beam data corresponding to different directions, so as to facilitate wake-up word detection with the plurality of beam data, and wake up the intelligent home device after a set keyword in the beam data is detected. In the related art, in order to increase the speed of waking up the intelligent home device, parallel wake-up word detection is performed on the plurality of beam data respectively.

Although the above solution can increase the speed of waking up the intelligent home device, since the parallel wake-up word detection needs to consume more processing resources and requires high computing capability for the intelligent home device, the manufacturing cost of the intelligent home device is increased, and the user experience is degraded.

In order to solve the above problem, the technical solution according to embodiments of the present disclosure obtains a plurality of beam data and performs frequency sampling on each of the plurality of beam data. A plurality of beam frequency correlation coefficients are obtained based on frequency sampling data of each of the plurality of beam data, the beam frequency correlation coefficient sum corresponding to each of the plurality of beam data is obtained based on the plurality of beam frequency correlation coefficients, and the beam data having the beam frequency correlation coefficient sum satisfying a preset correlation coefficient requirement in the plurality of beam data is selected as target beam data. In the above solution, since when the sound emitted by the sound source includes a wake-up word, the probability of successful detection of the wake-up word in the target beam data of the plurality of beam data is higher. Therefore, when a plurality of beam data are obtained, there is no need to perform wake-up word detection on all the beam data, but only on the target beam data. Thus, without affecting the detection speed of the wake-up word, the processing resources required for detecting the wake-up word can be reduced, the computing capability requirement for the computing device performing the wake-up word detection can be reduced, the manufacturing cost of the computing device can be reduced, and the user experience can be improved.

The technical solution provided by embodiments of the present disclosure relates to an electronic device 100 shown in FIG. 1. The electronic device 100 includes a microphone array 101. The microphone array 101 includes a plurality of sound acquisition modules 102, and the plurality of sound acquisition modules 102 point in different directions with the electronic device 100 as the center.

Figure 2A:
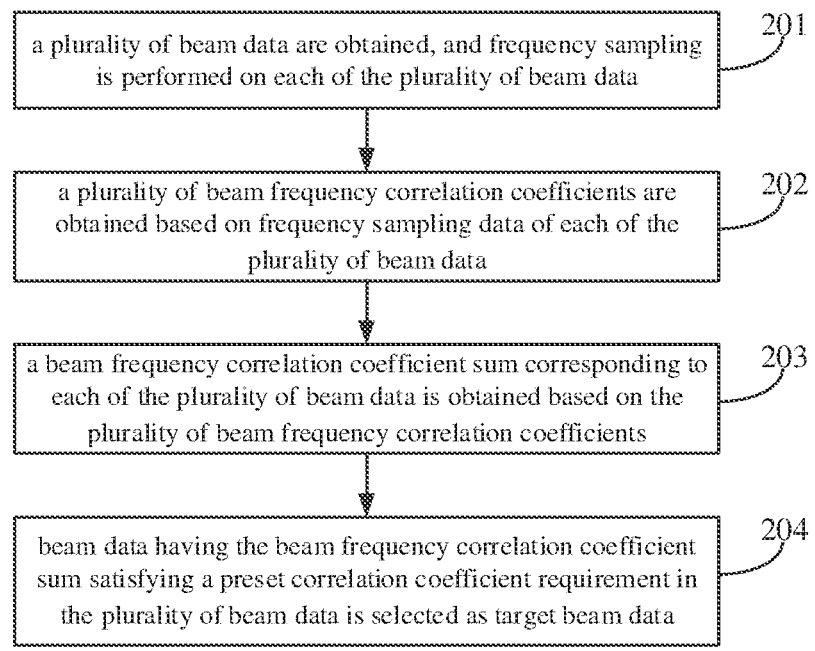
FIG. 2a is a flow chart of a method for selecting from a plurality of beams according to an exemplary embodiment of the present disclosure.

Embodiments of the present disclosure provide a method for selecting from a plurality of beams. As illustrated in FIG. 2a, the method includes blocks 201 to 204.

At block 201, a plurality of beam data are obtained, and frequency sampling is performed on each of the plurality of beam data.

The plurality of beam data may be understood as dividing the space centered on the electronic device into a plurality of regions, each region corresponding to one beam datum. Frequency sampling on each of the plurality of beam data may be understood as frequency sampling on each of the plurality of beam data with the same sampling interval, and the obtained frequency sampling data includes a plurality of frequency values.

At block 202, a plurality of beam frequency correlation coefficients are obtained based on frequency sampling data of each of the plurality of beam data.

The beam frequency correlation coefficient is configured to indicate a similarity between one in the plurality of beam data and another one in the plurality of beam data.

In an embodiment, $m_1$ and $m_2$ respectively denote index numbers of beams corresponding to any two of the plurality of beam data, $X_{m_1}(k)$ denotes the frequency sampling value of the beam data of the $m_1$ beam, $X_{m_2}(k)$ denotes the frequency sampling value of the beam data of the $m_2$ beam, the beam frequency correlation coefficient $R_{m_1,m_2}$ between the beam data of the two beams can be obtained by $$R_{m_1,m_2} = \sum_{k=0}^{N-1} X_{m_1}(k) X_{m_2}(k)^*,$$

where $X_{m_2}(k)^*$ is the conjugate transposition of $X_{m_2}(k)$, N denotes the frequency point sampled in the beam data. For example, N may be a power of 2, for example, N may be 256.

At block 203, a beam frequency correlation coefficient sum corresponding to each of the plurality of beam data is obtained based on the plurality of beam frequency correlation coefficients.

In an embodiment, when there are L beam data (L is an integer greater than 1) in the plurality of beam data, the beam frequency correlation coefficient sum corresponding to each of the L beam data may be understood as the sum obtained by adding the beam data to the beam frequency correlation coefficient of each of the (L−1) beam data, i.e., by adding the (L−1) beam frequency correlation coefficient sum together.

At block 204, beam data having the beam frequency correlation coefficient sum satisfying a preset correlation coefficient requirement in the plurality of beam data is selected as target beam data.

In an embodiment, beam data having a largest beam frequency correlation coefficient sum in the plurality of beam data may be selected as the target beam data, or the beam data having the largest beam frequency correlation coefficient sum and beam data having the smallest beam frequency correlation coefficient sum in the plurality of beam data may be selected as the target beam data.

With the technical solution according to embodiments of the present disclosure, by obtaining a plurality of beam data and performing frequency sampling on each of the plurality of beam data, a plurality of beam frequency correlation coefficients are obtained based on frequency sampling data of each of the plurality of beam data, the beam frequency correlation coefficient sum corresponding to each of the plurality of beam data is obtained based on the plurality of beam frequency correlation coefficients, and the beam data having the beam frequency correlation coefficient sum satisfying the preset correlation coefficient requirement in the plurality of beam data is selected as target beam data. In the above solution, when the sound emitted by the sound source includes a wake-up word, the probability of successful detection of the wake-up word in the target beam data of the plurality of beam data is higher and, when a plurality of beam data are obtained, there is no need to perform wake-up word detection on all the beam data, but only on the target beam data. Thus, without affecting the detection speed of the wake-up word, the processing resources required for detecting the wake-up word can be reduced, the computing capability requirement for the computing device performing the wake-up word detection can be reduced, the manufacturing cost of the computing device can be reduced, and the user experience can be improved.

Figure 2B:
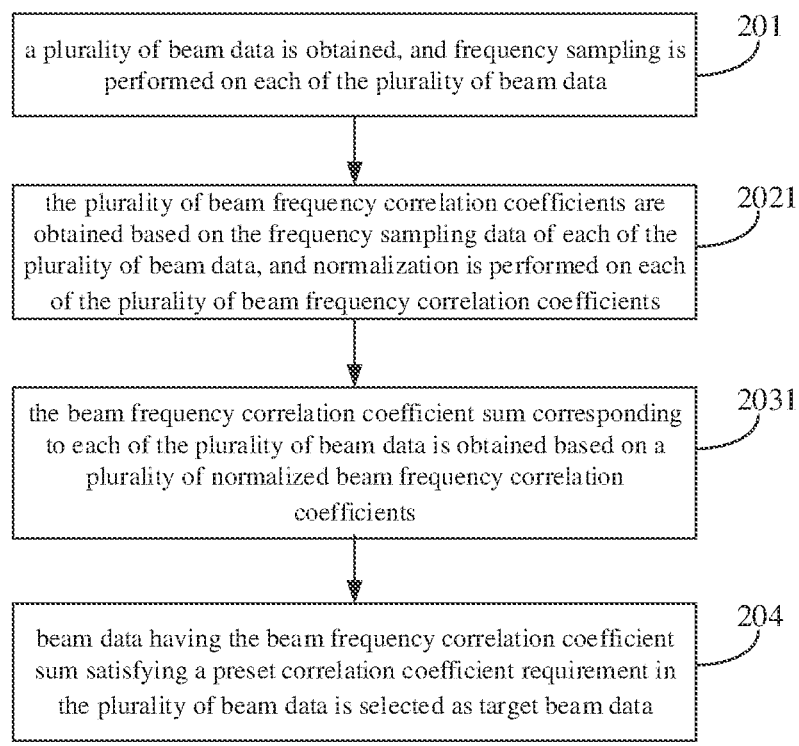
FIG. 2b is a flow chart of a method for selecting from a plurality of beams according to an exemplary embodiment of the present disclosure.

In an embodiment, as illustrated in FIG. 2b, the obtaining a plurality of beam frequency correlation coefficients based on frequency sampling data of each of the plurality of beam data in block 202 may be implemented by block 2021.

At block 2021, the plurality of beam frequency correlation coefficients are obtained based on the frequency sampling data of each of the plurality of beam data, and normalization is performed on each of the plurality of beam frequency correlation coefficients.

In an embodiment, obtaining the plurality of beam frequency correlation coefficients based on the frequency sampling data of each of the plurality of beam data and performing normalization on each of the plurality of beam frequency correlation coefficients may be implemented by obtaining the beam frequency correlation coefficient $R_{m_1,m_2}$ by $$R_{m_1,m_2} = \sum_{k=0}^{N-1} \frac{X_{m_1}(k)X_{m_2}(k)^*}{|X_{m_1}(k)||X_{m_2}(k)^*|},$$

where $m_1$ and $m_2$ denote the index numbers of beams corresponding to any two of the plurality of beam data, $X_{m_1}(k)$ denotes the frequency sampling value of the beam data of the $m_1$ beam, $X_{m_2}(k)$ denotes the frequency sampling value of the beam data of the $m_2$ beam, $X_{m_2}(k)^*$ is the conjugate transposition of $X_{m_2}(k)$, N denotes the frequency point sampled in the beam data.

In an embodiment, the obtaining the beam frequency correlation coefficient sum corresponding to each of the plurality of beam data based on the plurality of beam frequency correlation coefficients in block 203 may be implemented by block 2031.

At block 2031, the beam frequency correlation coefficient sum corresponding to each of the plurality of beam data is obtained based on a plurality of normalized beam frequency correlation coefficients.

By obtaining the plurality of normalized beam frequency correlation coefficients, and obtaining the beam frequency correlation coefficient sum corresponding to each of the plurality of beam data based on the plurality of normalized beam frequency correlation coefficients, the effect of the frequency amplitude on the beam frequency correlation coefficient sum in the frequency sampling data can be reduced, and the success rate of the wake-up word detection can be improved.

Figure 2C:
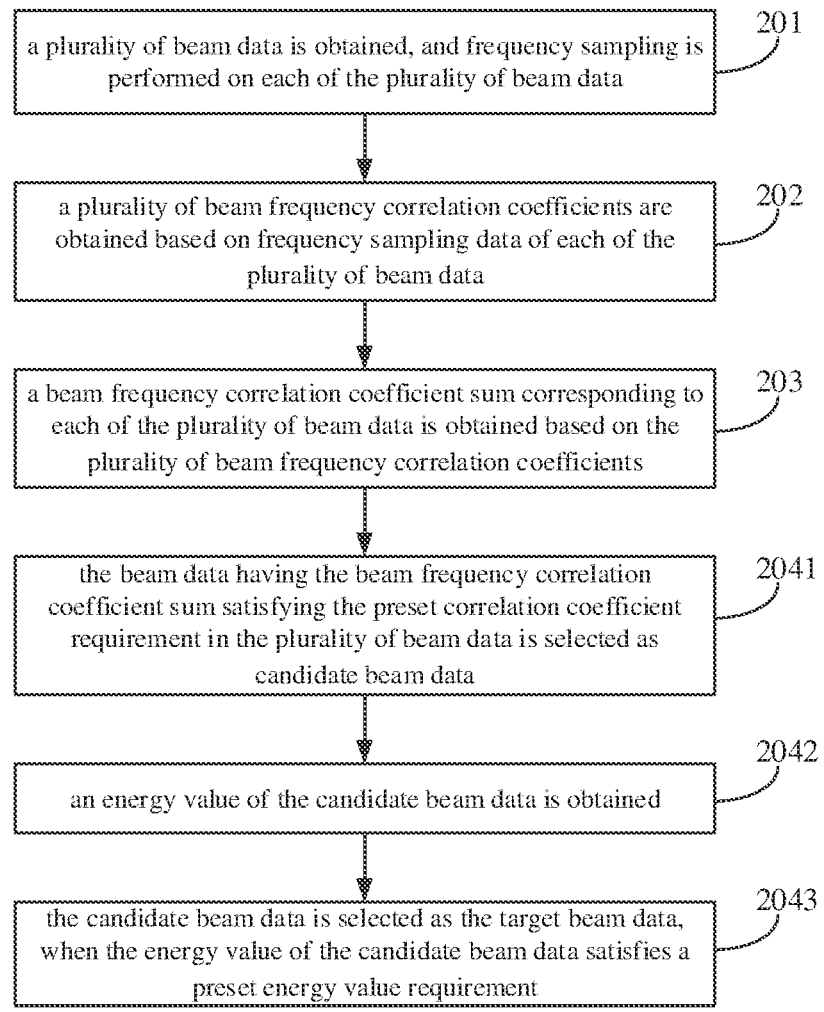
FIG. 2c is a flow chart of a method for selecting from a plurality of beams according to an exemplary embodiment of the present disclosure.

In an embodiment, as illustrated in FIG. 2c, the selecting the beam data having the beam frequency correlation coefficient sum satisfying the preset correlation coefficient requirement in the plurality of beam data as the target beam data in block 204 may be implemented by blocks 2041 to 2043.

At block 2041, the beam data having the beam frequency correlation coefficient sum satisfying the preset correlation coefficient requirement in the plurality of beam data is selected as candidate beam data.

At block 2042, an energy value of the candidate beam data is obtained.

At block 2043, the candidate beam data is selected as the target beam data, when the energy value of the candidate beam data satisfies a preset energy value requirement.

In an embodiment, when the energy value of the beam data is greater than or equal to a preset energy threshold, the candidate beam data is selected as the target beam data, where the preset energy threshold may be the noise energy threshold obtained by sampling noise.

By selecting the beam data having the beam frequency correlation coefficient sum satisfying the preset correlation coefficient requirement in the plurality of beam data as the candidate beam data, and obtaining an energy value of the candidate beam data, and selecting the candidate beam data as the target beam data when the energy value of the candidate beam data satisfies a preset energy value requirement, the interference caused by the noise on the selection from the plurality of beams can be avoided.

Figure 2D:
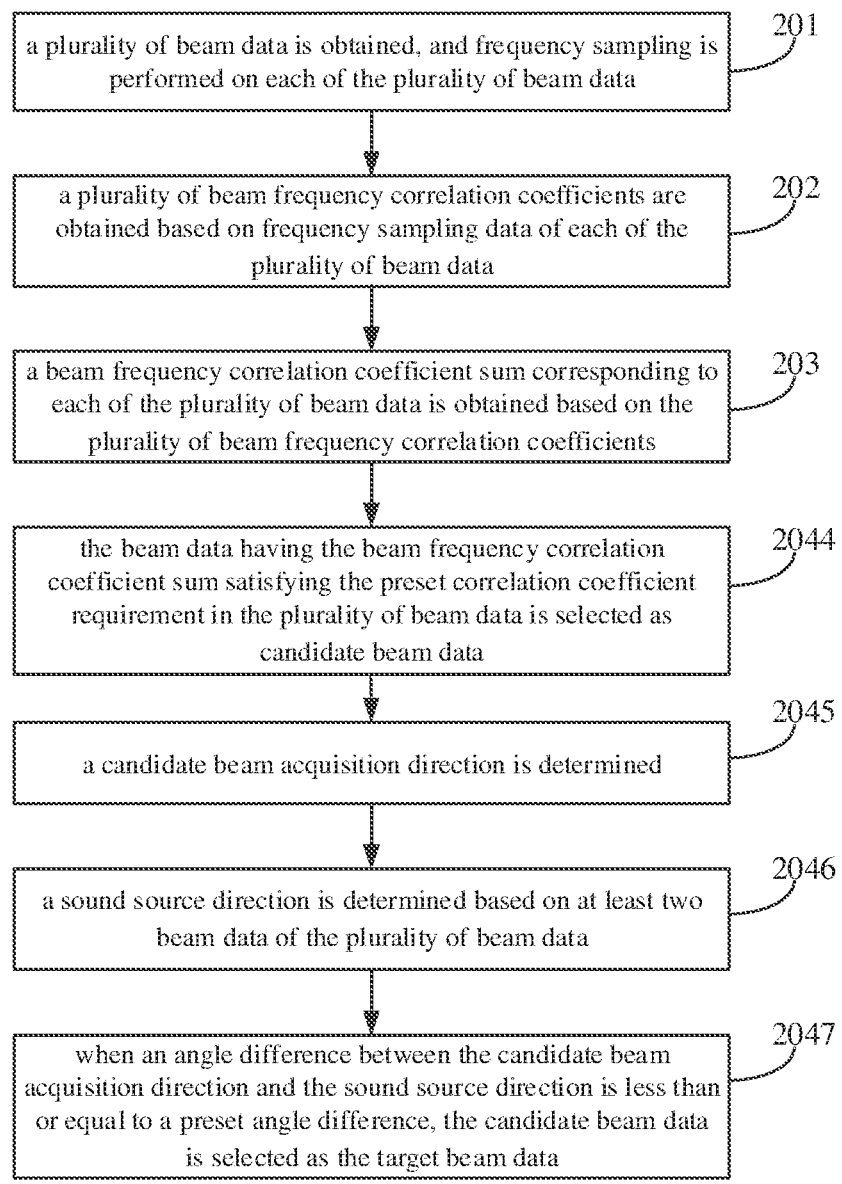
FIG. 2d is a flow chart of a method for selecting from a plurality of beams according to an exemplary embodiment of the present disclosure.

In an embodiment, as illustrated in FIG. 2d, the selecting the beam data having the beam frequency correlation coefficient sum satisfying the preset correlation coefficient requirement in the plurality of beam data as the target beam data in block 204 may be implemented by blocks 2044 to 2047.

At block 2044, the beam data having the beam frequency correlation coefficient sum satisfying the preset correlation coefficient requirement in the plurality of beam data is selected as candidate beam data.

At block 2045, a candidate beam acquisition direction is determined.

In an embodiment, the candidate beam acquisition direction denotes an orientation direction of a sound acquisition module acquiring the candidate beam data.

At block 2046, a sound source direction is determined based on at least two beam data of the plurality of beam data.

In an embodiment, the sound source direction denotes a direction in which the sound acquisition module points to a sound source.

In an embodiment, determining the sound source direction based on at least two beam data of the plurality of beam data may include obtaining a sound source propagation delay between at least two beam data, and determining the sound source direction based on the propagation delay.

At block 2047, when an angle difference between the candidate beam acquisition direction and the sound source direction is less than or equal to a preset angle difference, the candidate beam data is selected as the target beam data.

In an embodiment, the candidate beam acquisition direction may be understood as the direction pointed by the candidate beam. When the angle difference between the candidate beam acquisition direction and the sound source direction is less than or equal to a preset angle difference, it can be understood that the sound source is located in the direction pointed by the candidate beam.

By selecting the beam data having the beam frequency correlation coefficient sum satisfying the preset correlation coefficient requirement in the plurality of beam data as the candidate beam data, determining the candidate beam acquisition direction, and determining the sound source direction based on at least two beam data of the plurality of beam data, and selecting the candidate beam data as the target beam data when the angle difference between the candidate beam acquisition direction and the sound source direction is less than or equal to the preset angle difference, it can be ensured that the sound source is in the direction pointed by the target beam, the success rate of wake-up word detection can be improved.

The implementation process will be described in detail below through embodiments.

Figure 3:
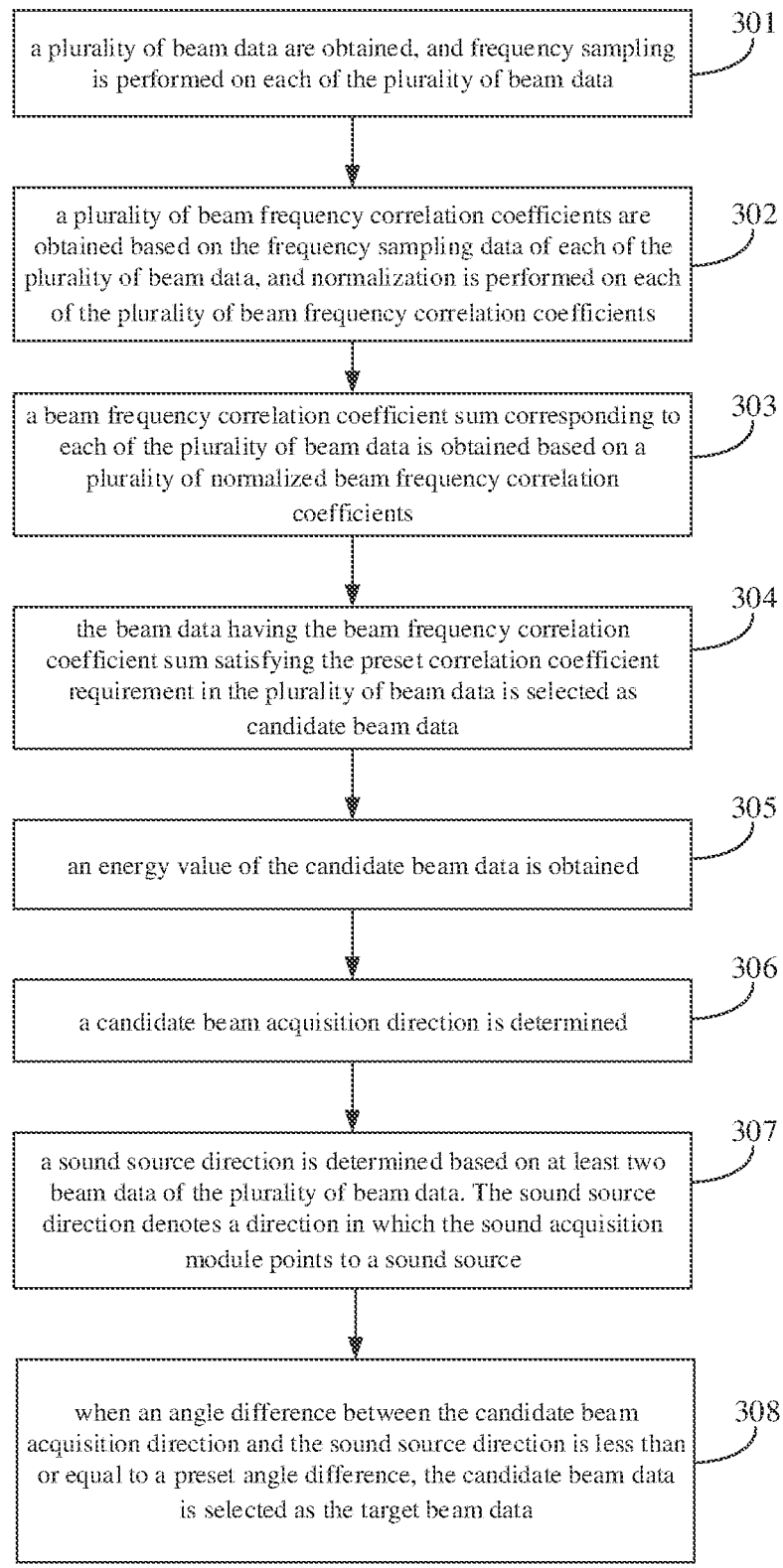
FIG. 3 is a flow chart of a method for selecting from a plurality of beams according to an exemplary embodiment of the present disclosure.

FIG. 3 is a flow chart of a method for selecting from a plurality of beams according to an exemplary embodiment of the present disclosure. As illustrated in FIG. 3, the method may include the following operations.

At block 301, a plurality of beam data are obtained, and frequency sampling is performed on each of the plurality of beam data.

At block 302, a plurality of beam frequency correlation coefficients are obtained based on the frequency sampling data of each of the plurality of beam data, and normalization is performed on each of the plurality of beam frequency correlation coefficients.

At block 303, a beam frequency correlation coefficient sum corresponding to each of the plurality of beam data is obtained based on a plurality of normalized beam frequency correlation coefficients.

At block 304, the beam data having the beam frequency correlation coefficient sum satisfying the preset correlation coefficient requirement in the plurality of beam data is selected as candidate beam data.

At block 305, an energy value of the candidate beam data is obtained.

At block 306, a candidate beam acquisition direction is determined.

The candidate beam acquisition direction denotes an orientation direction of a sound acquisition module acquiring the candidate beam data.

At block 307, a sound source direction is determined based on at least two beam data of the plurality of beam data. The sound source direction denotes a direction in which the sound acquisition module points to a sound source.

At block 308, when an angle difference between the candidate beam acquisition direction and the sound source direction is less than or equal to a preset angle difference, the candidate beam data is selected as the target beam data.

With the technical solution according to embodiments of the present disclosure, by obtaining a plurality of beam data and performing frequency sampling on each of the plurality of beam data, a plurality of beam frequency correlation coefficients are obtained based on frequency sampling data of each of the plurality of beam data, the beam frequency correlation coefficient sum corresponding to each of the plurality of beam data is obtained based on the plurality of beam frequency correlation coefficients, and the beam data having the beam frequency correlation coefficient sum satisfying the preset correlation coefficient requirement in the plurality of beam data is selected as target beam data. In the above solution, when the sound emitted by the sound source includes a wake-up word, the probability of successful detection of the wake-up word in the target beam data of the plurality of beam data is higher and, when a plurality of beam data are obtained, there is no need to perform wake-up word detection on all the beam data, but only on the target beam data. Thus, without affecting the detection speed of the wake-up word, the processing resources required for detecting the wake-up word can be reduced, the computing capability requirement for the computing device performing the wake-up word detection can be reduced, the manufacturing cost of the computing device can be reduced, and the user experience can be improved.

The following is the device embodiments of the present disclosure, which may be used to implement the method embodiments of the present disclosure.

Figure 4A:
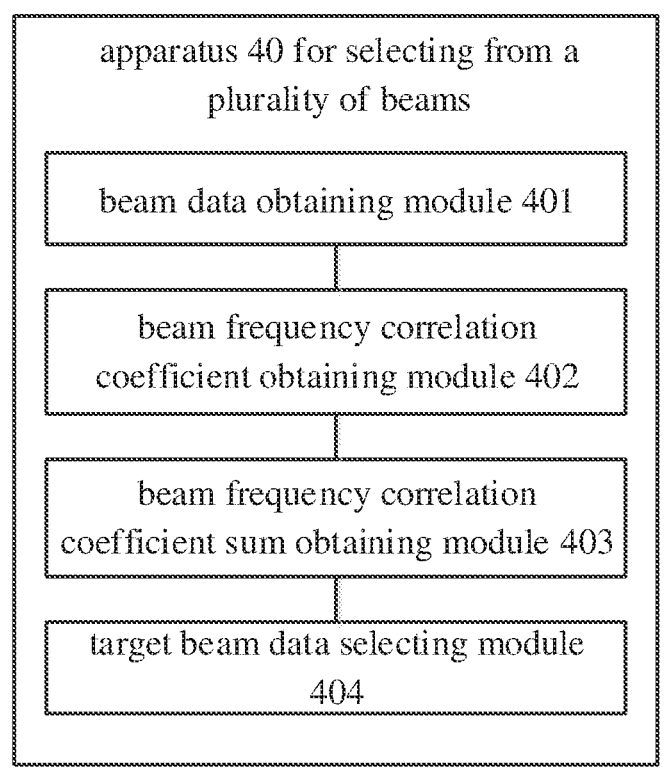
FIG. 4a is a block diagram of an apparatus for selecting from a plurality of beams according to an exemplary embodiment of the present disclosure.

FIG. 4a is a block diagram of an apparatus 40 for selecting from a plurality of beams according to an exemplary embodiment. The apparatus 40 may be an electronic device or a part of the electronic device. The apparatus 40 may be implemented as part or all of the electronic device by software, hardware, or a combination of both. As shown in FIG. 4a, the apparatus 40 includes a beam data obtaining module 401, a beam frequency correlation coefficient obtaining module 402, a beam frequency correlation coefficient sum obtaining module 403, and a target beam data selecting module 404.

The beam data obtaining module 401 is configured to obtain a plurality of beam data, and perform frequency sampling on each of the plurality of beam data. The beam frequency correlation coefficient obtaining module 402 is configured to obtain a plurality of beam frequency correlation coefficients based on frequency sampling data of each of the plurality of beam data. The beam frequency correlation coefficient is configured to indicate a similarity between one in the plurality of beam data and another one in the plurality of beam data. The beam frequency correlation coefficient sum obtaining module 403 is configured to obtain a beam frequency correlation coefficient sum corresponding to each of the plurality of beam data based on the plurality of beam frequency correlation coefficients. The target beam data selecting module 404 is configured to select beam data having the beam frequency correlation coefficient sum satisfying a preset correlation coefficient requirement in the plurality of beam data as target beam data.

Figure 4B:
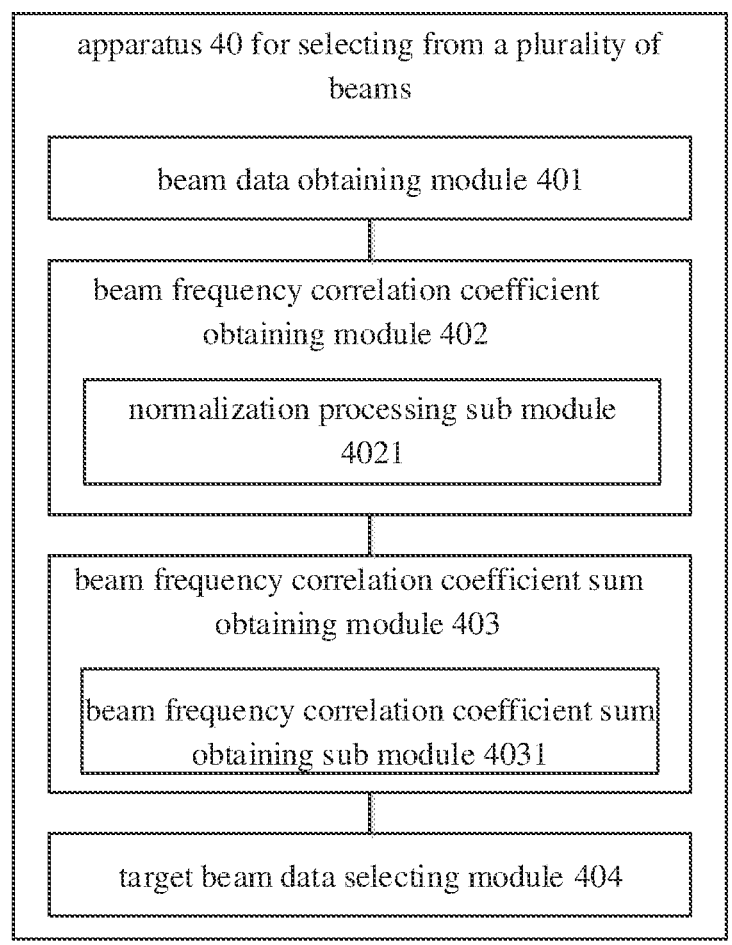
FIG. 4b is a block diagram of an apparatus for selecting from a plurality of beams according to an exemplary embodiment of the present disclosure.

In an embodiment, as illustrated in FIG. 4b, the beam frequency correlation coefficient obtaining module 402 includes a normalization processing sub module 4021. The normalization processing sub module 4021 is configured to obtain the plurality of beam frequency correlation coefficients based on the frequency sampling data of each of the plurality of beam data, and perform normalization on each of the plurality of beam frequency correlation coefficients.

The beam frequency correlation coefficient sum obtaining module 403 includes a beam frequency correlation coefficient sum obtaining sub module 4031. The beam frequency correlation coefficient sum obtaining sub module 4031 is configured to obtain the beam frequency correlation coefficient sum corresponding to each of the plurality of beam data based on a plurality of normalized beam frequency correlation coefficients.

Figure 4C:
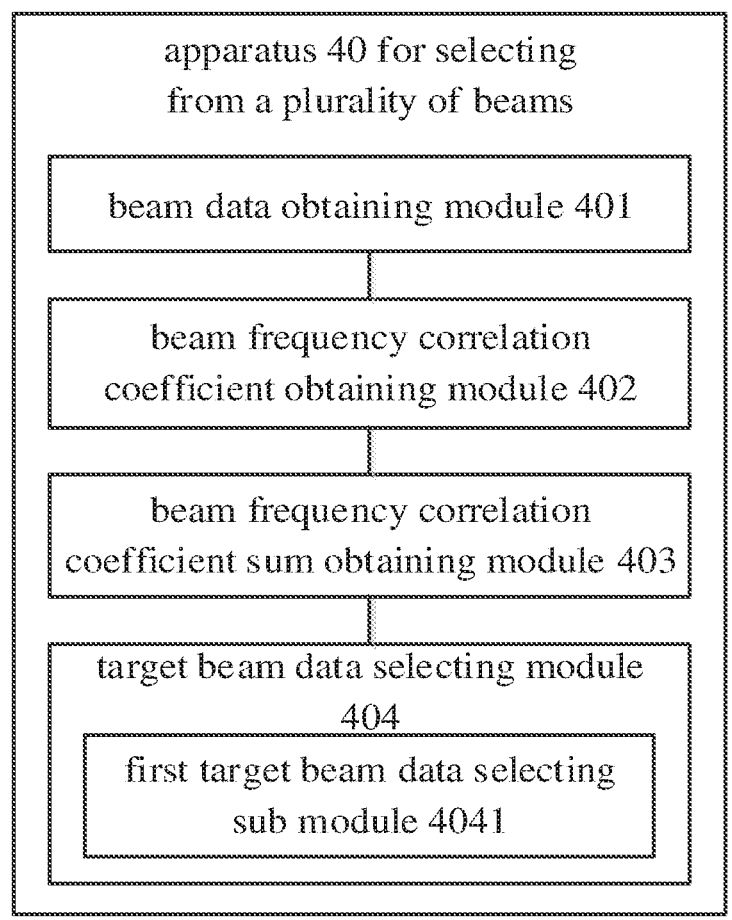
FIG. 4c is a block diagram of an apparatus for selecting from a plurality of beams according to an exemplary embodiment of the present disclosure.

In an embodiment, as illustrated in FIG. 4c, the target beam data selecting module 404 includes a first target beam data selecting sub module 4041. The first target beam data selecting sub module 4041 is configured to select beam data having a largest beam frequency correlation coefficient sum in the plurality of beam data as the target beam data, or select the beam data having the largest beam frequency correlation coefficient sum and beam data having the smallest beam frequency correlation coefficient sum in the plurality of beam data as the target beam data.

Figure 4D:
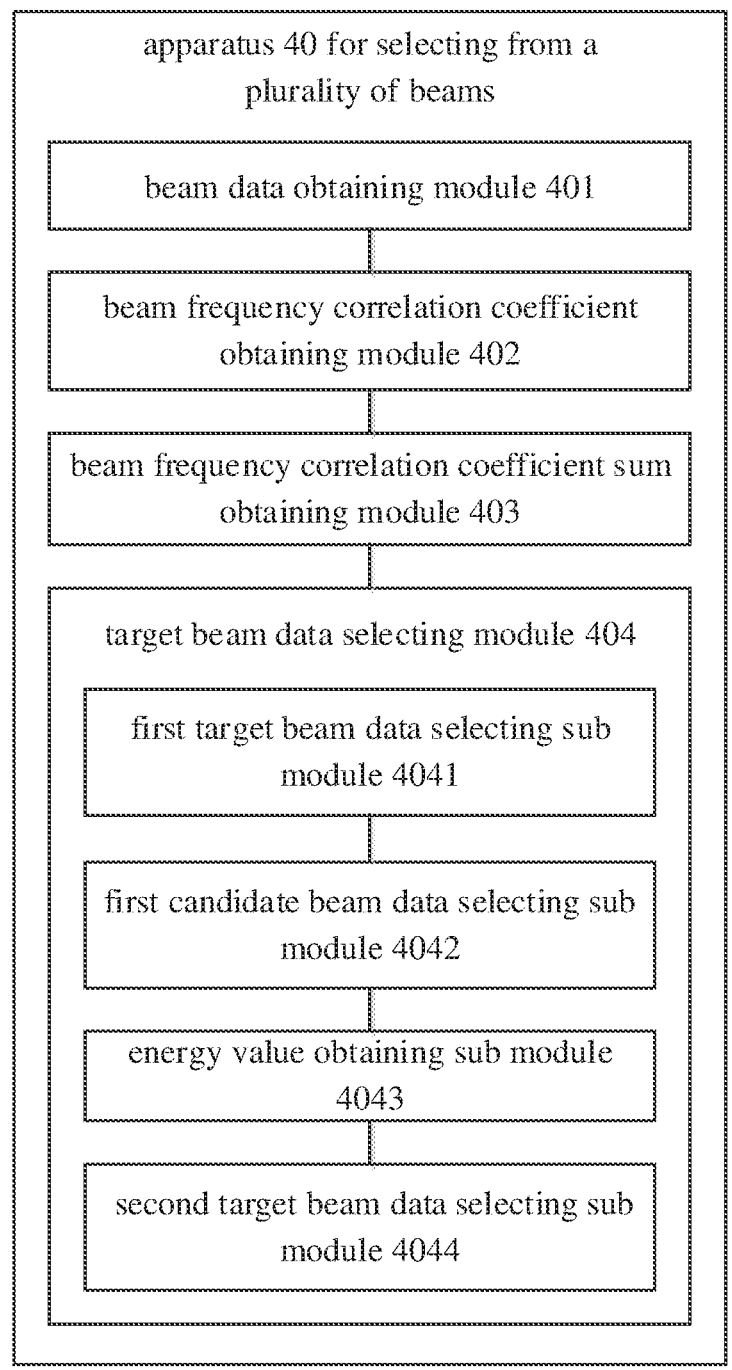
FIG. 4d is a block diagram of an apparatus for selecting from a plurality of beams according to an exemplary embodiment of the present disclosure.

In an embodiment, as illustrated in FIG. 4d, the target beam data selecting module 404 includes a first candidate beam data selecting sub module 4042, an energy value obtaining sub module 4043, and a second target beam data selecting sub module 4044. The first candidate beam data selecting sub module 4042 is configured to select the beam data having the beam frequency correlation coefficient sum satisfying the preset correlation coefficient requirement in the plurality of beam data as candidate beam data. The energy value obtaining sub module 4043 is configured to obtain an energy value of the candidate beam data. The second target beam data selecting sub module 4044 is configured to select the candidate beam data as the target beam data, when the energy value of the candidate beam data satisfies a preset energy value requirement.

Figure 4E:
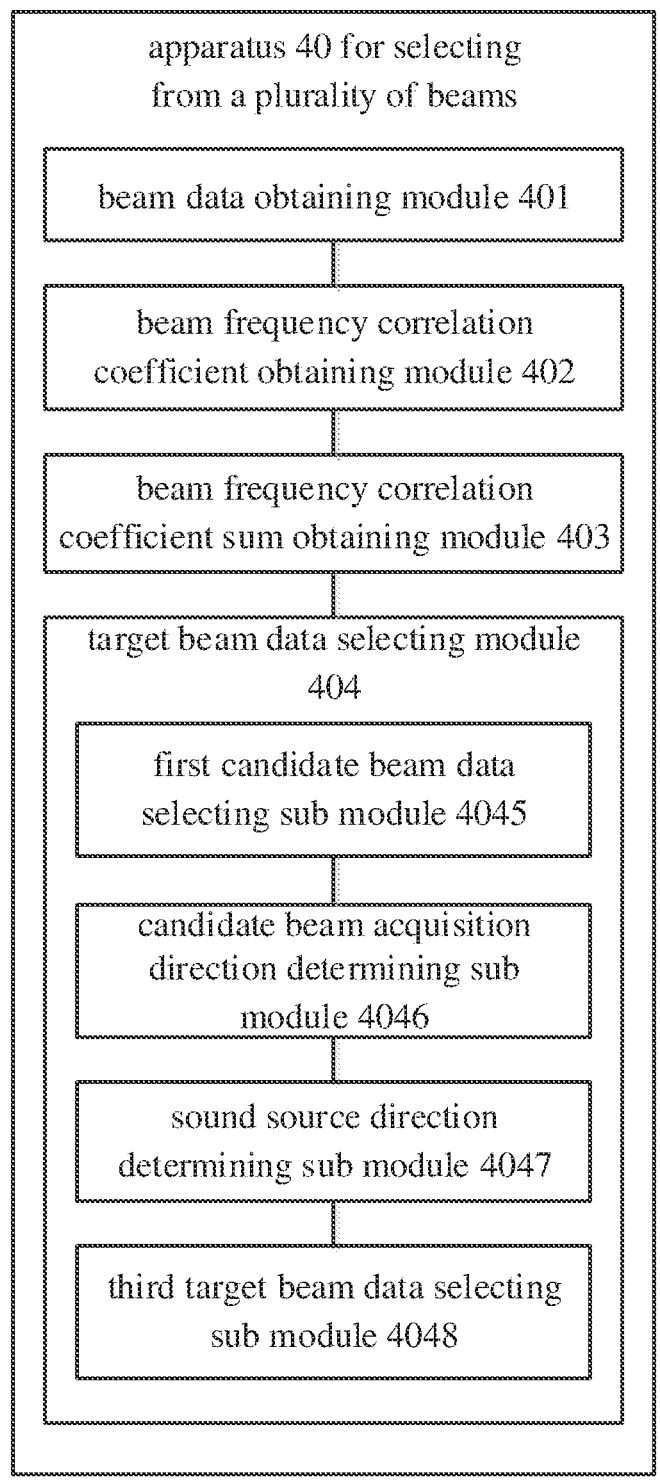
FIG. 4e is a block diagram of an apparatus for selecting from a plurality of beams according to an exemplary embodiment of the present disclosure.

In an embodiment, as illustrated in FIG. 4e, the target beam data selecting module 404 includes a first candidate beam data selecting sub module 4045, a candidate beam acquisition direction determining sub module 4046, a sound source direction determining sub module 4047, and a third target beam data selecting sub module 4048. The first candidate beam data selecting sub module 4045 is configured to select the beam data having the beam frequency correlation coefficient sum satisfying the preset correlation coefficient requirement in the plurality of beam data as candidate beam data. The candidate beam acquisition direction determining sub module 4046 is configured to determine a candidate beam acquisition direction. The candidate beam acquisition direction denotes an orientation direction of a sound acquisition module acquiring the candidate beam data. The sound source direction determining sub module 4047 is configured to determine a sound source direction based on at least two beam data of the plurality of beam data. The sound source direction denotes a direction in which the sound acquisition module points to a sound source. The third target beam data selecting sub module 4048 is configured to select the candidate beam data as the target beam data when an angle difference between the candidate beam acquisition direction and the sound source direction is less than or equal to a preset angle difference.

With the apparatus for selecting from a plurality of beams according to embodiments of the present disclosure, by obtaining a plurality of beam data and performing frequency sampling on each of the plurality of beam data, a plurality of beam frequency correlation coefficients are obtained based on frequency sampling data of each of the plurality of beam data, the beam frequency correlation coefficient sum corresponding to each of the plurality of beam data is obtained based on the plurality of beam frequency correlation coefficients, and the beam data having the beam frequency correlation coefficient sum satisfying the preset correlation coefficient requirement in the plurality of beam data is selected as target beam data. In the above solution, when the sound emitted by the sound source includes a wake-up word, the probability of successful detection of the wake-up word in the target beam data of the plurality of beam data is higher, when a plurality of beam data are obtained, there is no need to perform wake-up word detection on all the beam data, but only on the target beam data. Thus, without affecting the detection speed of the wake-up word, the processing resources required for detecting the wake-up word can be reduced, the computing capability requirement for the computing device performing the wake-up word detection can be reduced, the manufacturing cost of the computing device can be reduced, and the user experience can be improved.

Figure 5:
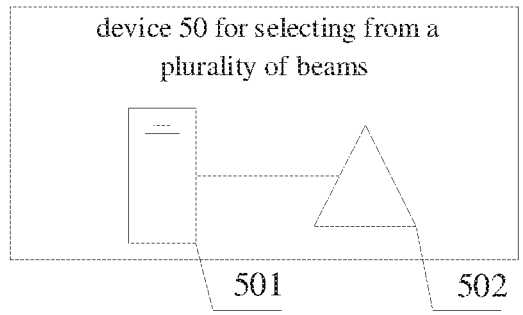
FIG. 5 is a schematic diagram of a device according to an embodiment of the present disclosure.

FIG. 5 is a schematic diagram of a device 50 for selecting from a plurality of beams according to an embodiment of the present disclosure. The device 50 may be an electronic device or a part of the electronic device. The device 50 includes a processor 501 and a memory 502 configured to store instructions executable by the processor 501. The processor 501 is configured to: obtain a plurality of beam data, and perform frequency sampling on each of the plurality of beam data; obtain a plurality of beam frequency correlation coefficients based on frequency sampling data of each of the plurality of beam data, in which the beam frequency correlation coefficient is configured to indicate a similarity between one in the plurality of beam data and another one in the plurality of beam data; obtain a beam frequency correlation coefficient sum corresponding to each of the plurality of beam data based on the plurality of beam frequency correlation coefficients; and select beam data having the beam frequency correlation coefficient sum satisfying a preset correlation coefficient requirement in the plurality of beam data as target beam data.

In an embodiment, when the processor 501 is configured to obtain the plurality of beam frequency correlation coefficients based on the frequency sampling data of each of the plurality of beam data, the processor 501 is configured to obtain the plurality of beam frequency correlation coefficients based on the frequency sampling data of each of the plurality of beam data, and perform normalization on each of the plurality of beam frequency correlation coefficients.

When the processor 501 is configured to obtain the beam frequency correlation coefficient sum corresponding to each of the plurality of beam data based on the plurality of beam frequency correlation coefficients, the processor 501 is configured to obtain the beam frequency correlation coefficient sum corresponding to each of the plurality of beam data based on a plurality of normalized beam frequency correlation coefficients.

In an embodiment, when the processor 501 is configured to select the beam data having the beam frequency correlation coefficient sum satisfying the preset correlation coefficient requirement in the plurality of beam data as the target beam data, the processor 501 is configured to: select beam data having a largest beam frequency correlation coefficient sum in the plurality of beam data as the target beam data; or select the beam data having the largest beam frequency correlation coefficient sum and beam data having the smallest beam frequency correlation coefficient sum in the plurality of beam data as the target beam data.

In an embodiment, when the processor 501 is configured to select the beam data having the beam frequency correlation coefficient sum satisfying the preset correlation coefficient requirement in the plurality of beam data as the target beam data, the processor 501 is configured to: select the beam data having the beam frequency correlation coefficient sum satisfying the preset correlation coefficient requirement in the plurality of beam data as candidate beam data; obtain an energy value of the candidate beam data; and select the candidate beam data as the target beam data, when the energy value of the candidate beam data satisfies a preset energy value requirement.

In an embodiment, when the processor 501 is configured to select the beam data having the beam frequency correlation coefficient sum satisfying the preset correlation coefficient requirement in the plurality of beam data as the target beam data, the processor 501 is configured to: select the beam data having the beam frequency correlation coefficient sum satisfying the preset correlation coefficient requirement in the plurality of beam data as candidate beam data; determine a candidate beam acquisition direction, in which the candidate beam acquisition direction denotes an orientation direction of a sound acquisition module acquiring the candidate beam data; determine a sound source direction based on at least two beam data of the plurality of beam data, in which the sound source direction denotes a direction in which the sound acquisition module points to a sound source; and select the candidate beam data as the target beam data when an angle difference between the candidate beam acquisition direction and the sound source direction is less than or equal to a preset angle difference.

With the device for selecting from a plurality of beams according to embodiments of the present disclosure, by obtaining a plurality of beam data and performing frequency sampling on each of the plurality of beam data, a plurality of beam frequency correlation coefficients are obtained based on frequency sampling data of each of the plurality of beam data, the beam frequency correlation coefficient sum corresponding to each of the plurality of beam data is obtained based on the plurality of beam frequency correlation coefficients, and the beam data having the beam frequency correlation coefficient sum satisfying the preset correlation coefficient requirement in the plurality of beam data is selected as target beam data. In the above solution, when the sound emitted by the sound source includes a wake-up word, the probability of successful detection of the wake-up word in the target beam data of the plurality of beam data is higher and, when a plurality of beam data are obtained, there is no need to perform wake-up word detection on all the beam data, but only on the target beam data. Thus, without affecting the detection speed of the wake-up word, the processing resources required for detecting the wake-up word can be reduced, the computing capability requirement for the computing device performing the wake-up word detection can be reduced, the manufacturing cost of the computing device can be reduced, and the user experience can be improved.

Figure 6:
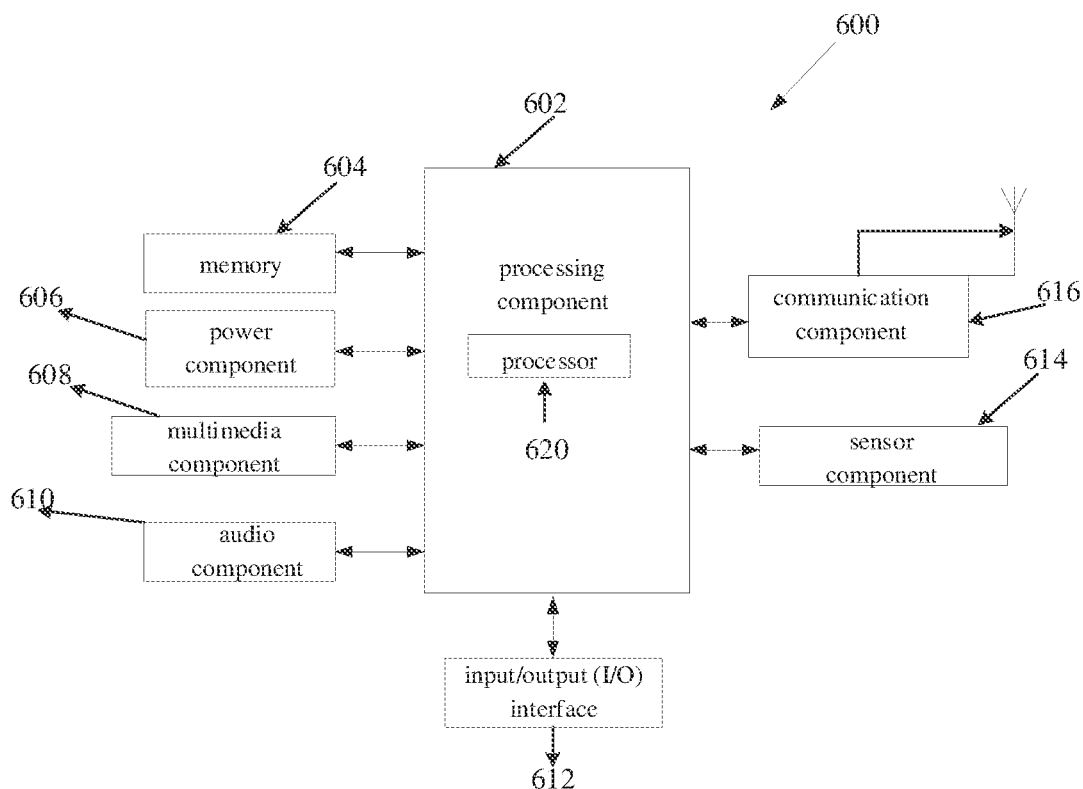
FIG. 6 is a schematic diagram of a device according to an embodiment of the present disclosure.

FIG. 6 is a block diagram of a device 600 for selecting from a plurality of beams according to an exemplary embodiment. The device 600 may be a smart speaker, a mobile phone, a computer, a digital broadcasting terminal, a messaging device, a game console, a tablet device, a medical device, an exercise equipment, and a personal digital assistant, etc.

The device 600 may include one or more of following components; a processing component 602, a memory 604, a power component 606, a multimedia component 608, an audio component 610, an input/output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 may include a power management system, one or more power sources, and any other components associated with the generation, management, and distribution of power in the device 600.

The multimedia component 608 includes a screen providing an output interface between the device 600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and other gestures on the touch panel. The touch sensors may not only sense a boundary of a touch or swipe action, but also sense a duration time and a pressure associated with the touch or swipe action. In some embodiments, the multimedia component 608 includes a front camera and/or a rear camera. The front camera and the rear camera may receive external multimedia data while the device 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone (MIC) configured to receive an external audio signal when the device 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the device 600. For instance, the sensor component 614 may detect an open/closed status of the device 600 and relative positioning of components (e.g., the display and the keypad of the device 600). The sensor component 614 may also detect a change in position of the device 600 or of a component in the device 600, a presence or absence of user contact with the device 600, an orientation or an acceleration/deceleration of the device 600, and a change in temperature of the device 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate wired or wireless communication between the device 600 and other devices. The device 600 can access a wireless network based on a communication standard, such as WIFI, 2G, or 3G, or a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as the memory 604 including instructions. The above instructions are executable by the processor 620 in the device 600, for performing the above-described methods. For example, the non-transitory computer-readable storage medium may be a ROM, a RAM, a CD-ROM, a magnetic tape, a floppy disc, an optical data storage device, and the like.

The present disclosure further provides a non-transitory computer-readable storage medium stored thereon with instructions, when the instructions are executed by the device 600, causing the device 600 to perform the above method for selecting from a plurality of beams. The method includes: obtaining a plurality of beam data, and performing frequency sampling on each of the plurality of beam data; obtaining a plurality of beam frequency correlation coefficients based on frequency sampling data of each of the plurality of beam data, in which the beam frequency correlation coefficient is configured to indicate a similarity between one in the plurality of beam data and another one in the plurality of beam data; obtaining a beam frequency correlation coefficient sum corresponding to each of the plurality of beam data based on the plurality of beam frequency correlation coefficients; and selecting beam data having the beam frequency correlation coefficient sum satisfying a preset correlation coefficient requirement in the plurality of beam data as target beam data.

In an embodiment, obtaining the plurality of beam frequency correlation coefficients based on the frequency sampling data of each of the plurality of beam data includes: obtaining the plurality of beam frequency correlation coefficients based on the frequency sampling data of each of the plurality of beam data, and performing normalization on each of the plurality of beam frequency correlation coefficients. Obtaining the beam frequency correlation coefficient sum corresponding to each of the plurality of beam data based on the plurality of beam frequency correlation coefficients includes: obtaining the beam frequency correlation coefficient sum corresponding to each of the plurality of beam data based on a plurality of normalized beam frequency correlation coefficients.

In an embodiment, selecting the beam data having the beam frequency correlation coefficient sum satisfying the preset correlation coefficient requirement in the plurality of beam data as the target beam data includes: selecting beam data having a largest beam frequency correlation coefficient sum in the plurality of beam data as the target beam data; or selecting the beam data having the largest beam frequency correlation coefficient sum and beam data having the smallest beam frequency correlation coefficient sum in the plurality of beam data as the target beam data.

In an embodiment, selecting the beam data having the beam frequency correlation coefficient sum satisfying the preset correlation coefficient requirement in the plurality of beam data as the target beam data includes: selecting the beam data having the beam frequency correlation coefficient sum satisfying the preset correlation coefficient requirement in the plurality of beam data as candidate beam data; obtaining an energy value of the candidate beam data; and selecting the candidate beam data as the target beam data, when the energy value of the candidate beam data satisfies a preset energy value requirement.

In an embodiment, selecting the beam data having the beam frequency correlation coefficient sum satisfying the preset correlation coefficient requirement in the plurality of beam data as the target beam data includes: selecting the beam data having the beam frequency correlation coefficient sum satisfying the preset correlation coefficient requirement in the plurality of beam data as candidate beam data; determining a candidate beam acquisition direction, in which the candidate beam acquisition direction denotes an orientation direction of a sound acquisition module acquiring the candidate beam data; determining a sound source direction based on at least two beam data of the plurality of beam data, in which the sound source direction denotes a direction in which the sound acquisition module points to a sound source; and when an angle difference between the candidate beam acquisition direction and the sound source direction is less than or equal to a preset angle difference, selecting the candidate beam data as the target beam data.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for selecting from a plurality of beams, the method being performed by an electronic device and comprising:
   obtaining a plurality of beam data, and performing frequency sampling on each of the plurality of beam data, wherein a space centered on the electronic device is divided into a plurality of regions and each region corresponds to one beam datum;

obtaining, for each of the plurality of beam data, a plurality of beam frequency correlation coefficients based on frequency sampling data of the plurality of beam data, wherein a beam frequency correlation coefficient is configured to indicate a similarity between one in the plurality of beam data and another one in the plurality of beam data;

obtaining, for each of the plurality of beam data, a beam frequency correlation coefficient sum based on the plurality of beam frequency correlation coefficients; and selecting beam data having the beam frequency correlation coefficient sum satisfying a preset correlation coefficient requirement in the plurality of beam data as target beam data, wherein the beam frequency correlation coefficient for an $m_1$ beam and an $m_2$ beam is obtained by $$R_{m_1,m_2} = \sum_{k=0}^{N-1} X_{m_1}(k) X_{m_2}(k)^*,$$

where, $m_1$ and $m_2$ denote index numbers of beams corresponding to any two of the plurality of beam data, $X_{m_1}(k)$ denotes frequency sampling data of the $m_1$ beam, $X_{m_2}(k)$ denotes frequency sampling data of the $m_2$ beam, $R_{m_1,m_2}$ denotes the beam frequency correlation coefficient, $X_{m_2}(k)^*$ denotes a conjugate transposition of $X_{m_2}(k)$, and N denotes a number of frequency points sampled in the beam data.

2. The method according to claim 1, wherein:

obtaining, for each of the plurality of beam data, the plurality of beam frequency correlation coefficients based on the frequency sampling data of the plurality of beam data comprises: obtaining, for each of the plurality of beam data, the plurality of beam frequency correlation coefficients based on the frequency sampling data of the plurality of beam data, and performing normalization on each of the plurality of beam frequency correlation coefficients; and obtaining, for each of the plurality of beam data, the beam frequency correlation coefficient sum based on the plurality of beam frequency correlation coefficients comprises: obtaining, for each of the plurality of beam data, the beam frequency correlation coefficient sum based on a plurality of normalized beam frequency correlation coefficients.

3. The method according to claim 1, wherein selecting the beam data having the beam frequency correlation coefficient sum satisfying the preset correlation coefficient requirement in the plurality of beam data as the target beam data comprises one of:

selecting beam data having a largest beam frequency correlation coefficient sum in the plurality of beam data as the target beam data; and selecting the beam data having the largest beam frequency correlation coefficient sum and beam data having a smallest beam frequency correlation coefficient sum in the plurality of beam data as the target beam data.

4. The method according to claim 1, wherein selecting the beam data having the beam frequency correlation coefficient sum satisfying the preset correlation coefficient requirement in the plurality of beam data as the target beam data comprises:

selecting the beam data having the beam frequency correlation coefficient sum satisfying the preset correlation coefficient requirement in the plurality of beam data as candidate beam data;

obtaining an energy value of the candidate beam data; and selecting the candidate beam data as the target beam data, when the energy value of the candidate beam data satisfies a preset energy value requirement.

5. The method according to claim 1, wherein selecting the beam data having the beam frequency correlation coefficient sum satisfying the preset correlation coefficient requirement in the plurality of beam data as the target beam data comprises:

selecting the beam data having the beam frequency correlation coefficient sum satisfying the preset correlation coefficient requirement in the plurality of beam data as candidate beam data;

determining a candidate beam acquisition direction, wherein the candidate beam acquisition direction denotes an orientation direction of a sound acquisition module acquiring the candidate beam data;

determining a sound source direction based on at least two beam data of the plurality of beam data, wherein the sound source direction denotes a direction in which the sound acquisition module points to a sound source; and when an angle difference between the candidate beam acquisition direction and the sound source direction is less than or equal to a preset angle difference, selecting the candidate beam data as the target beam data.

6. The method according to claim 5, wherein determining the sound source direction based on at least two beam data of the plurality of beam data comprises:

obtaining a sound source propagation delay between the at least two beam data; and determining the sound source direction based on the propagation delay.

7. A device for selecting from a plurality of beams, comprising:

a processor;

a memory configured to store instructions executable by the processor;

wherein the processor is configured to:

obtain a plurality of beam data, and performing frequency sampling on each of the plurality of beam data, wherein a space centered on the device is divided into a plurality of regions and each region corresponds to one beam datum;

obtain, for each of the plurality of beam data, a plurality of beam frequency correlation coefficients based on frequency sampling data of the plurality of beam data, wherein a beam frequency correlation coefficient is configured to indicate a similarity between one in the plurality of beam data and another one in the plurality of beam data;

obtain, for each of the plurality of beam data, a beam frequency correlation coefficient sum based on the plurality of beam frequency correlation coefficients; and select beam data having the beam frequency correlation coefficient sum satisfying a preset correlation coefficient requirement in the plurality of beam data as target beam data, wherein the beam frequency correlation coefficient for an $m_1$ beam and an $m_2$ beam is obtained by $$R_{m_1,m_2} = \sum_{k=0}^{N-1} X_{m_1}(k) X_{m_2}(k)^*,$$

where, $m_1$ and $m_2$ denote index numbers of beams corresponding to any two of the plurality of beam data, $X_{m_1}(k)$ denotes frequency sampling data of the $m_1$ beam, $X_{m_2}(k)$ denotes frequency sampling data of the $m_2$ beam, $R_{m_1,m_2}$ denotes the beam frequency correlation coefficient, $X_{m_2}(k)^*$ denotes a conjugate transposition of $X_{m_2}(k)$, and N denotes a number of frequency points sampled in the beam data.

8. The device according to claim 7, wherein:
in obtaining, for each of the plurality of beam data, the plurality of beam frequency correlation coefficients based on the frequency sampling data of the plurality of beam data, the processor is further configured to: obtain, for each of the plurality of beam data, the plurality of beam frequency correlation coefficients based on the frequency sampling data of the plurality of beam data, and perform normalization on each of the plurality of beam frequency correlation coefficients;
in obtaining, for each of the plurality of beam data, the beam frequency correlation coefficient sum based on the plurality of beam frequency correlation coefficients, the processor is further configured to: obtain, for each of the plurality of beam data, the beam frequency correlation coefficient sum based on a plurality of normalized beam frequency correlation coefficients.

9. The device according to claim 7, wherein in selecting the beam data having the beam frequency correlation coefficient sum satisfying the preset correlation coefficient requirement in the plurality of beam data as the target beam data, the processor is further configured to perform one of:
selecting beam data having a largest beam frequency correlation coefficient sum in the plurality of beam data as the target beam data; and
selecting the beam data having the largest beam frequency correlation coefficient sum and beam data having the smallest beam frequency correlation coefficient sum in the plurality of beam data as the target beam data.

10. The device according to claim 7, wherein in selecting the beam data having the beam frequency correlation coefficient sum satisfying the preset correlation coefficient requirement in the plurality of beam data as the target beam data, the processor is further configured to:
select the beam data having the beam frequency correlation coefficient sum satisfying the preset correlation coefficient requirement in the plurality of beam data as candidate beam data;
obtain an energy value of the candidate beam data; and
select the candidate beam data as the target beam data, when the energy value of the candidate beam data satisfies a preset energy value requirement.

11. The device according to claim 7, wherein in selecting the beam data having the beam frequency correlation coefficient sum satisfying the preset correlation coefficient requirement in the plurality of beam data as the target beam data, the processor is further configured to:
select the beam data having the beam frequency correlation coefficient sum satisfying the preset correlation coefficient requirement in the plurality of beam data as candidate beam data;
determine a candidate beam acquisition direction, wherein the candidate beam acquisition direction denotes an orientation direction of a sound acquisition module acquiring the candidate beam data;
determine a sound source direction based on at least two beam data of the plurality of beam data, wherein the sound source direction denotes a direction in which the sound acquisition module points to a sound source; and
select the candidate beam data as the target beam data when an angle difference between the candidate beam acquisition direction and the sound source direction is less than or equal to a preset angle difference.

12. The device according to claim 11, wherein in determining the sound source direction based on at least two beam data of the plurality of beam data, the processor is further configured to:
obtain a sound source propagation delay between the at least two beam data; and
determine the sound source direction based on the propagation delay.

13. A non-transitory computer-readable storage medium having stored thereon instructions that, when executed by a processor of a device, cause the device to perform a method for selecting from a plurality of beams, the method comprising:
obtaining a plurality of beam data, and performing frequency sampling on each of the plurality of beam data, wherein a space centered on the device is divided into a plurality of regions and each region corresponds to one beam datum;
obtaining, for each of the plurality of beam data, a plurality of beam frequency correlation coefficients based on frequency sampling data of the plurality of beam data, wherein a beam frequency correlation coefficient is configured to indicate a similarity between one in the plurality of beam data and another one in the plurality of beam data;
obtaining, for each of the plurality of beam data, a beam frequency correlation coefficient sum based on the plurality of beam frequency correlation coefficients; and
selecting beam data having the beam frequency correlation coefficient sum satisfying a preset correlation coefficient requirement in the plurality of beam data as target beam data,
wherein the beam frequency correlation coefficient for an $m_1$ beam and an $m_2$ beam is obtained by $$R_{m_1,m_2} = \sum_{k=0}^{N-1} X_{m_1}(k) X_{m_2}(k)^*,$$

where, $m_1$ and $m_2$ denote index numbers of beams corresponding to any two of the plurality of beam data, $X_{m_1}(k)$ denotes frequency sampling data of the $m_1$ beam, $X_{m_2}(k)$ denotes frequency sampling data of the $m_2$ beam, $R_{m_1,m_2}$ denotes the beam frequency correlation coefficient, $X_{m_2}(k)^*$ denotes a conjugate transposition of $X_{m_2}(k)$, and N denotes a number of frequency points sampled in the beam data.

14. The non-transitory computer-readable storage medium according to claim 13, wherein:
obtaining, for each of the plurality of beam data, the plurality of beam frequency correlation coefficients based on the frequency sampling data of the plurality of beam data comprises: obtaining, for each of the plurality of beam data, the plurality of beam frequency correlation coefficients based on the frequency sampling data of the plurality of beam data, and performing normalization on each of the plurality of beam frequency correlation coefficients; and obtaining, for each of the plurality of beam data, the beam frequency correlation coefficient sum based on the plurality of beam frequency correlation coefficients comprises: obtaining, for each of the plurality of beam data, the beam frequency correlation coefficient sum based on a plurality of normalized beam frequency correlation coefficients.

15. The non-transitory computer-readable storage medium according to claim 13, wherein selecting the beam data having the beam frequency correlation coefficient sum satisfying the preset correlation coefficient requirement in the plurality of beam data as the target beam data comprises one of:

selecting beam data having a largest beam frequency correlation coefficient sum in the plurality of beam data as the target beam data; and selecting the beam data having the largest beam frequency correlation coefficient sum and beam data having a smallest beam frequency correlation coefficient sum in the plurality of beam data as the target beam data.

16. The non-transitory computer-readable storage medium according to claim 13, wherein selecting the beam data having the beam frequency correlation coefficient sum satisfying the preset correlation coefficient requirement in the plurality of beam data as the target beam data comprises:

selecting the beam data having the beam frequency correlation coefficient sum satisfying the preset correlation coefficient requirement in the plurality of beam data as candidate beam data;

obtaining an energy value of the candidate beam data; and selecting the candidate beam data as the target beam data, when the energy value of the candidate beam data satisfies a preset energy value requirement.

17. The non-transitory computer-readable storage medium according to claim 13, wherein selecting the beam data having the beam frequency correlation coefficient sum satisfying the preset correlation coefficient requirement in the plurality of beam data as the target beam data comprises:

selecting the beam data having the beam frequency correlation coefficient sum satisfying the preset correlation coefficient requirement in the plurality of beam data as candidate beam data;

determining a candidate beam acquisition direction, wherein the candidate beam acquisition direction denotes an orientation direction of a sound acquisition module acquiring the candidate beam data;

determining a sound source direction based on at least two beam data of the plurality of beam data, wherein the sound source direction denotes a direction in which the sound acquisition module points to a sound source;

when an angle difference between the candidate beam acquisition direction and the sound source direction is less than or equal to a preset angle difference, selecting the candidate beam data as the target beam data.

18. The non-transitory computer-readable storage medium according to claim 17, wherein determining the sound source direction based on at least two beam data of the plurality of beam data comprises:

obtaining a sound source propagation delay between the at least two beam data; and determining the sound source direction based on the propagation delay.

* * * * *